United States Patent
Omelchuk et al.

(10) Patent No.: US 9,310,943 B1
(45) Date of Patent: Apr. 12, 2016

(54) MULTI-STAGE STYLUS SCANNING

(71) Applicant: Parade Technologies, Ltd., Santa Clara, CA (US)

(72) Inventors: Ruslan Omelchuk, Lviv (UA); Mykhaylo Krekhovetskyy, Lviv (UA); Viktor Kremin, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 206 days.

(21) Appl. No.: 13/741,090

(22) Filed: Jan. 14, 2013

Related U.S. Application Data

(60) Provisional application No. 61/587,509, filed on Jan. 17, 2012, provisional application No. 61/676,256, filed on Jul. 26, 2012.

(51) Int. Cl.
*G06F 3/044* (2006.01)

(52) U.S. Cl.
CPC .................................... *G06F 3/044* (2013.01)

(58) Field of Classification Search
CPC ... G06F 3/044; G06F 3/03545; G06F 3/0416; G06F 2203/04104; G06F 2203/04106; G06F 3/041; G06F 2203/04808; G06F 3/0412; G06F 3/04883
USPC ............ 345/173, 174, 179; 178/18.03, 18.06, 178/19.03, 19.01, 20.01
See application file for complete search history.

(56) References Cited

U.S. PATENT DOCUMENTS

| | | | | |
|---|---|---|---|---|
| 4,277,783 A | * | 7/1981 | Sampieri et al. | 345/182 |
| 4,686,332 A | * | 8/1987 | Greanias et al. | 345/173 |
| 5,365,461 A | * | 11/1994 | Stein et al. | 700/298 |
| 5,841,078 A | | 11/1998 | Miller et al. | |
| 6,762,752 B2 | | 7/2004 | Perski et al. | |
| 7,100,430 B2 | | 9/2006 | Samsavar et al. | |
| 2006/0012580 A1 | * | 1/2006 | Perski et al. | 345/173 |
| 2006/0012581 A1 | * | 1/2006 | Haim et al. | 345/173 |
| 2006/0197752 A1 | * | 9/2006 | Hurst et al. | 345/173 |
| 2007/0229468 A1 | * | 10/2007 | Peng et al. | 345/173 |
| 2009/0273579 A1 | | 11/2009 | Zachut et al. | |
| 2010/0155153 A1 | * | 6/2010 | Zachut | 178/18.03 |
| 2010/0315375 A1 | | 12/2010 | Yang | |
| 2011/0025629 A1 | * | 2/2011 | Grivna et al. | 345/173 |
| 2012/0162124 A1 | | 6/2012 | Lin | |
| 2012/0242612 A1 | | 9/2012 | Chang et al. | |
| 2012/0261199 A1 | | 10/2012 | Hsu et al. | |
| 2012/0280929 A1 | | 11/2012 | Rimon et al. | |
| 2013/0162585 A1 | * | 6/2013 | Schwartz | 345/174 |

OTHER PUBLICATIONS

SIPPO Office Action for International Application No. 201080042141.X dated Apr. 23, 2014; 6 pages.
Search Report for "Multi-Stage Stylus Scanning", Jan. 14, 2013, 3 of pages.

* cited by examiner

*Primary Examiner* — Koosha Sharifi-Tafreshi

(74) *Attorney, Agent, or Firm* — Morgan, Lewis & Bockius LLP

(57) ABSTRACT

A system comprises a processing device and a capacitive sense array that includes a plurality of electrodes. The system performs a first scan of a plurality of electrodes in a capacitive sense array to determine a position of a stylus. The system also performs one or more additional scans of subsets of the plurality of electrodes to determine additional positions of the stylus. The system may continually perform the additional scans on of the subsets of the plurality of electrodes until the stylus is no longer detected.

20 Claims, 11 Drawing Sheets

MULTI-STAGE STYLUS SCANNING

RELATED APPLICATIONS

This application claims the benefit of U.S. Provisional Application No. 61/587,509 filed on Jan. 17, 2012 and U.S. Provisional Application No. 61/676,256 filed on Jul. 26, 2012, the contents of which are hereby incorporated by reference.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered stylus approaches have been implemented for use with touch screens and are found in many consumer applications such as point-of-sale terminals (e.g., the signature pad used for credit card transactions in retail stores) and other public uses. Untethered active stylus approaches are also seen in various consumer applications. Generally, in an untethered active stylus approach, the stylus may be wirelessly synchronized to a capacitive sense array. A transmitter in or coupled to the capacitive sense array provides a synchronization signal that is received by a receiver in the stylus. The transmitter may wirelessly couple the synchronization signal in a variety of ways including, inductance, radio frequency, optical, ultrasound or other mediums. The stylus receives the synchronization signal from the transmitter and generates a transmit signal, based on the synchronization signal, which is detected by the capacitive sense array. Sensing circuitry in or coupled to the capacitive sense array can detect the presence of the stylus and determine a location of the stylus based on the detected transmit signal from the stylus.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Keeping synchronicity between the capacitive sense array and the stylus imposes a high burden on the system, as it has impacts on battery life, cost and design-in support. The system may be able reduce power usage and cost if an unsynchronized stylus (e.g., a stylus that does not synchronize with the operation of the capacitive sense array is used). In addition, reducing power usage for a system that uses a synchronized stylus and tracking a synchronized stylus more quickly may also be useful. Embodiments of a method and apparatus are described for detecting synchronized and unsynchronized styluses. In one embodiment, the system may perform a first scan (e.g., a full scan) of all the electrodes in the capacitive sense array to detect a stylus and determine a position of the stylus. After the first scan (e.g., the full scan), the system may perform reduced or fast scans of subsets of the electrodes (e.g., groups or slots of electrodes) to detect the stylus and to track the movement of the stylus. The system may continually perform the reduced or fast scans until the stylus is no longer detected. The system may identify subsets of electrodes based on an estimated motion of the stylus determined from previous full or fast scans.

Figure 1:
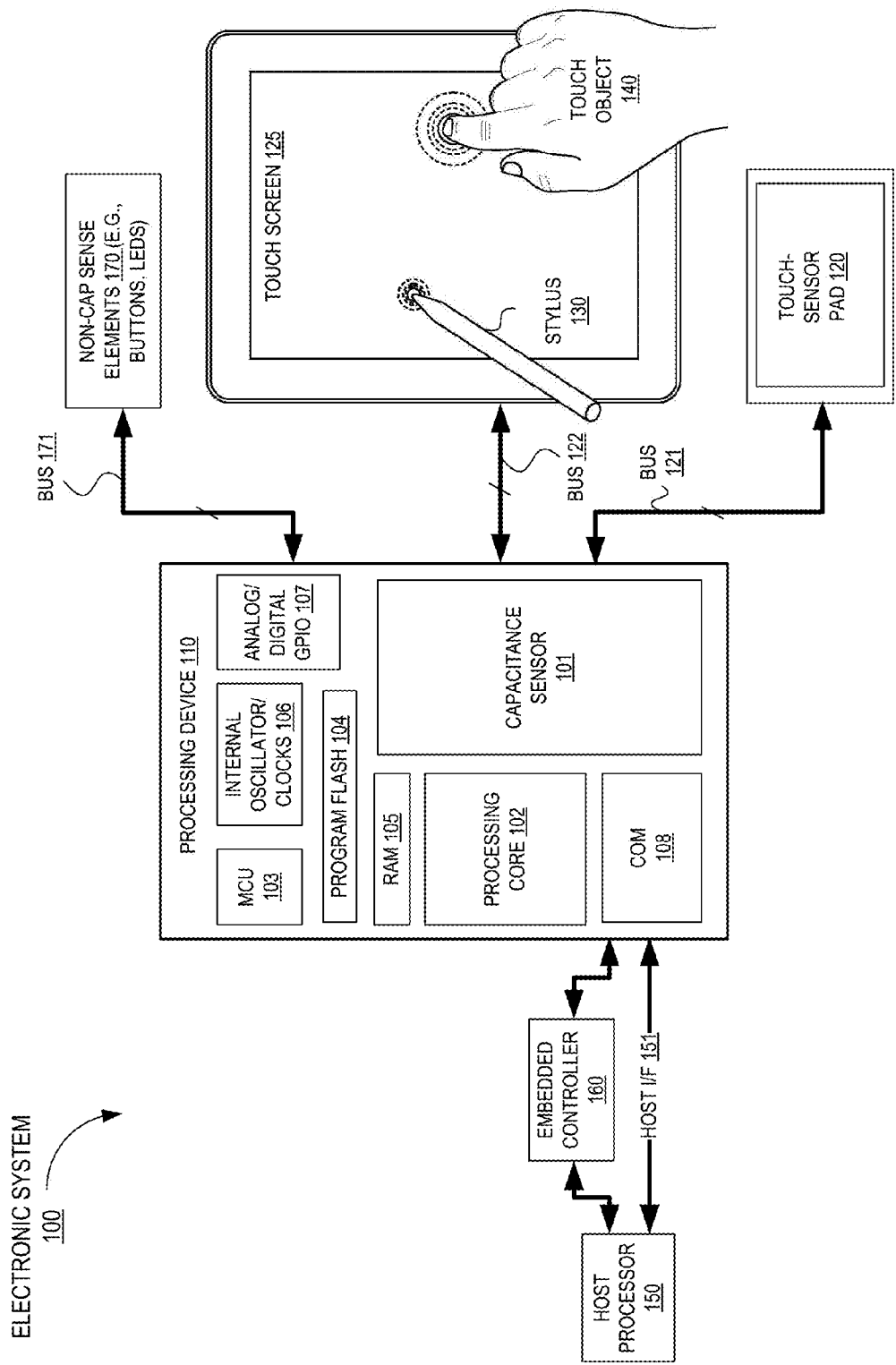
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, touch screen 125, touch sensor pad 120, stylus 130, host processor 150, embedded controller 160, and non-capacitance sense elements 170. In the depicted embodiment, the electronic system 100 includes the touch screen 125 coupled to the processing device 110 via bus 122. Touch screen 125 may include a multi-dimension capacitive sense array. The multi-dimension sense array may include multiple sense elements, organized as rows and columns. In another embodiment, the touch screen 125 operates as an all-points-addressable ("APA") mutual capacitance sense array. In another embodiment, the touch screen 125 operates as a coupled-charge receiver.

The operations and configurations of the processing device 110 and the touch screen 125 for detecting and tracking the touch object 140 and stylus 130 are described in detail below with respect to FIGS. 2A-10. In short, the processing device 110 is configured to detect a presence of the stylus 130 on the touch screen 125, as well as a presence of the touch object 140. The processing device 110 may detect and track the stylus 130 and the touch object 140 individually on the touch screen 125. In one embodiment, the processing device 110 can detect and track both the stylus 130 and touch object 140 concurrently on the touch screen 125. As described herein, the touch screen 125 capacitively couples with the stylus 130, as opposed to conventional inductive stylus applications. It should also be noted that the same assembly used for the touch screen 125, which is configured to detect touch objects 140, is also used to detect and track the stylus 130 without an additional PCB layer for inductively tracking the stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO ports 107.

As illustrated, capacitance sensor 101 may be integrated into processing device 110. Capacitance sensor 101 may include analog I/O for coupling to an external component, such as touch sensor pad 120, touch screen 125, touch-sensor slider (not shown), touch-sensor buttons (not shown), and/or other devices. Capacitance sensor 101 and processing device 110 are described in more detail below.

In one embodiment, the electronic system 100 includes a touch sensor pad 120 coupled to the processing device 110 via bus 121. Touch sensor pad 120 may include a multi-dimension capacitive sense array. The multi-dimension sense array may include multiple sense elements, organized as rows and columns. In another embodiment, the touch sensor pad 120 is an APA mutual capacitance sense array. In another embodiment, the touch sensor pad 120 operates as a coupled-charge receiver.

In an embodiment, the electronic system 100 may also include non-capacitance sense elements 170 coupled to the processing device 110 via bus 171 and GPIO port 107. The non-capacitance sense elements 170 may include buttons, light emitting diodes ("LEDs"), and other user interface devices, such as a mouse, a keyboard, or other functional keys that do not require capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit (IC) die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 101.

It should be noted that the components of electronic system 100 may include all the components described above. Alternatively, electronic system 100 may include only some of the components described above.

In one embodiment, the electronic system 100 is used in a tablet computer. Alternatively, the electronic device may be used in other applications, such as a notebook computer, a mobile handset (e.g., a smartphone or a cellular phone), a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring a gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2A:
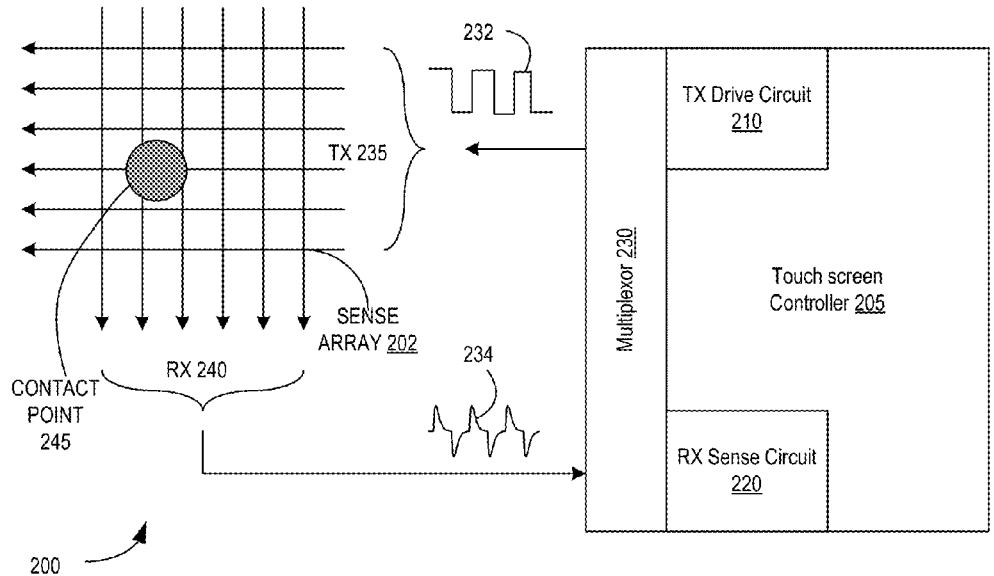
FIG. 2A is a block diagram illustrating a system including a capacitive sense array and a touch screen controller that converts measured capacitances to touch coordinates, according to an embodiment.

FIG. 2A is a block diagram illustrating one embodiment of a system 200 including the sense array 202 and a touch screen controller 205 that converts measured capacitances to touch coordinates. In an embodiment, the touch screen controller 205 is similar to the capacitance sensor 101 described above. In another embodiment, the touch screen controller 205 is the processing device 110. The sense array 202 includes TX lines 235 and RX lines 240. In an embodiment, the touch screen controller 205 includes a TX drive circuit 210, an RX sense circuit 220, and a multiplexor 230.

In an embodiment, a passive object (e.g., a finger or other conductive object) touches, or comes in close proximity to, the sense array 202 at contact point 245. The TX drive circuit 210 drives the TX lines 235 with TX signal 232. In one embodiment, TX driver circuit 210 may include a signal generator. The RX sense circuit 220 measures the RX signal 234 on RX lines 240. In an embodiment, the touch screen controller 205 determines the location of contact point 245. The TX lines 235 and RX lines 240 are multiplexed by multiplexor 230. The touch screen controller 205 provides the TX signal 232 on the TX lines 235 (rows) and measures the capacitance coupling on the RX lines 240 (columns). In an embodiment, the TX and RX lines 235, 240 are orthogonal and may be used interchangeably (e.g., transmitting on columns and receiving on rows). In an embodiment, the TX drive circuit 210 transmits the TX signal 232 through a high impedance ITO panel (TX lines 235), thus limiting the upper frequency limit and speed of the system. The total scan time may also depend upon the number of TX lines 235 and RX lines 240 in the sense array 202. For example, the TX drive circuit 210 provides a TX signal 232 on each TX line 235 and simultaneously reads the capacitively coupled RX signal 234 on each RX line 240, according to one embodiment. In another embodiment, the RX lines 240 are multiplexed in two or more scans, as described in conjunction with FIG. 2B. This may be one (of multiple) modes of operation of touch screen controller 205 (e.g., a touch mode or a finger mode).

Although the electrodes (e.g., lines 235 and 240) appear as lines in FIG. 2A, these electrodes may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 2B:
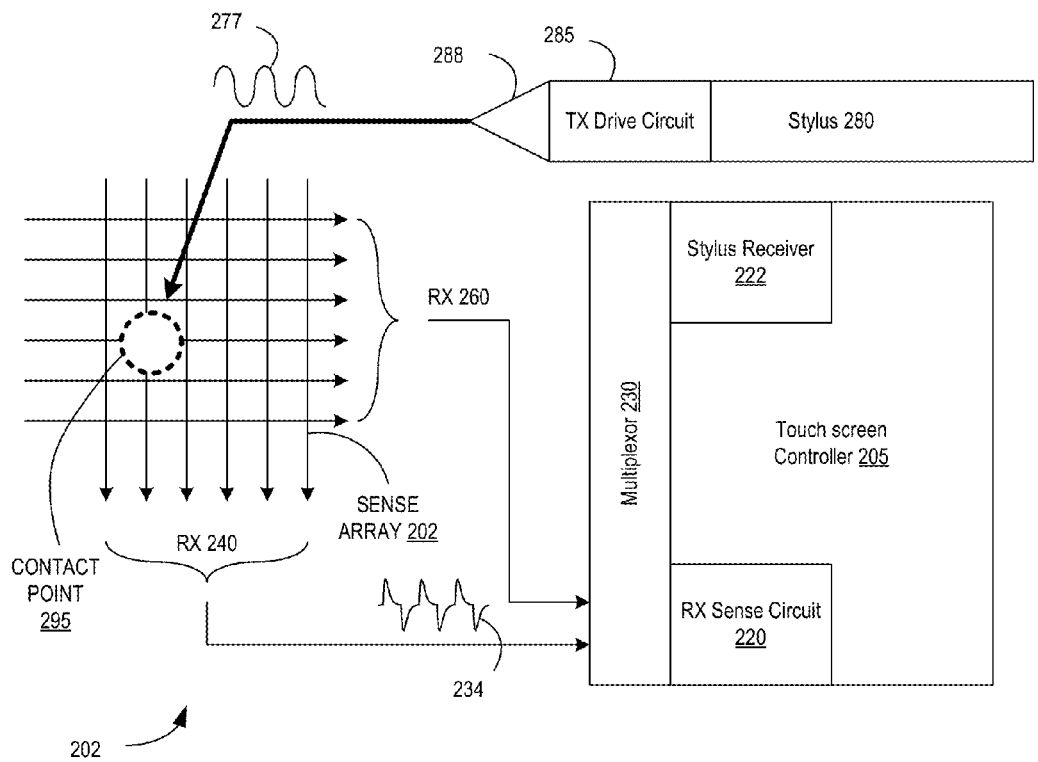
FIG. 2B is a block diagram illustrating a system including a capacitive sense array, a stylus, and a touch screen controller that converts measured capacitances to touch coordinates, according to an embodiment.

FIG. 2B is a block diagram illustrating one embodiment of a system 202 including the sense array 202, a stylus 280, and a touch screen controller 205 that converts measured capacitances to touch coordinates in another mode of operation (e.g., a stylus mode). In an embodiment, the touch screen controller 205 is similar to the capacitance sensor 101 described above. In another embodiment, the touch screen controller 205 is the processing device 110. The sense array 202 may be part of touch screen 125 or touch sensor pad 120 described above. In one embodiment, the sense array 202 may include RX lines 240 and 260. The touch screen controller 205 may include an RX sense circuit 220 and a multiplexor 230. The stylus 280 may include a TX drive circuit 285 and a stylus tip 288.

In one embodiment, the TX drive circuit 285 of stylus 280 provides a TX signal 277 directly to contact point 295 on sense array 202. The stylus tip 288 may actually touch a surface of the sense array 202 at contact point 295 or may come within a relatively close proximity of sense array 202. In one embodiment, the stylus 280 may not directly contact the electrodes in the sense array 202. The stylus 280 may contact a substrate above the sense array 202 or may contact a substrate on which the sensor array 20 is deposited. The substrate may be a dielectric material. The RX sense circuit 220 in touch screen controller 205 may measure the RX signal 234 on both the rows (RX lines 260) and columns (RX lines 240) of sense array 202 and stylus receiver 222 may identify the presence as stylus 280. In one embodiment, the touch screen controller 205 performs a stylus scan of the sense array 202 during RX sensing of the stylus TX signal 277. For the stylus scan, the touch screen controller 205 may measure a charge being capacitively coupled to the row and column electrodes of the sense array 202 from the stylus 280. In an array of N rows and M columns, a complete scan could only include a single RX signal measurement on each row and column, or N+M scans, thus resulting in a significantly reduced stylus scanning time for the entire sense array as compared with a mutual capacitance scanning time for the entire sense array. In one embodiment, multiple RX channels can be used to sense multiple RX lines at the same time. In this case, the complete scan could be (N+M)/(# RX channels).

As described above, a passive stylus may be used as a touch object to interface with the various touch screens described above. In contrast to passive styluses, an active stylus, as described herein provides the transmit ("TX") signal 277 that is typically provided by the touch screen controller 205 in finger sensing modes (e.g., touch modes). In one embodiment, the stylus 280 capacitively couples the stylus TX signal 277 to the sense array 202. In one embodiment, the stylus signal amplitude, frequency, phase, etc., may be the same or similar to that which is utilized for finger sensing by the touch screen controller 205. Alternatively, the stylus TX signal 277 may be different than the TX signal used for finger sensing in amplitude, frequency, and/or phase, and may thus be unsynchronized with TX signal 232. In another embodiment, the stylus TX signal 277 may have a different code for code modulation than a code used in the TX signal for finger sensing. In an exemplary embodiment, the stylus TX signal 277 has a greater amplitude than the finger sensing TX signal.

In one embodiment, the frequency of the stylus TX signal 277 is different than the frequency of the finger sensing TX signal. By using different TX frequencies, the touch screen controller 205 can differentiate between stylus TX signals and finger sensing TX signals. Alternatively, the touch screen controller 205 can differentiate the stylus TX signals from the TX drive circuit 210 TX signals 232 using other techniques as would be appreciated by those of ordinary skill in the art with the benefit of this disclosure, such as detecting the difference in signal characteristics (e.g., phase, frequency, amplitude, and code modulation). Various embodiments described herein are applicable to any mutual capacitance touch screen system using an untethered, or wireless active stylus (e.g., either synchronized or unsynchronized) configured to be capacitively coupled to the mutual capacitance array.

In one embodiment, the unsynchronized capacitive stylus receiver 222 has a low-impedance current input (i.e., RX signal 234). The low-impedance current input allows for stylus receiver input signal dependence elimination from parasitic capacitance change in the sensor electrodes of sense array 202. The sensor parasitic capacitance may change when human finger or palm is present on or near the sense array 202, however, stylus position should not be changed in this case. When the stylus receiver 222 has a low-impedance input, the changing panel parasitic capacitance may have no effect on the receiver signal. Capacitive stylus receiver 222 may further provide the narrow band sensing for out-of-band noise reduction. In one embodiment, stylus receiver 222 should provide sensing for only the stylus transmitter frequency. In addition, the receiver bandwidth should be easily controllable to eliminate the need to use more expensive ceramic or crystal oscillators. Furthermore, the stylus receiver 222 may provide ability to perform conversion within short time intervals. For example, the stylus position sensing time may take only approximately 20-30 periods of the stylus transmitter carrier signal. This allows sensing of the entire sense array 202 in a short period of time (e.g., 2 milliseconds). The touch screen controller readings may also be independent of the initial phase of the stylus transmitter carrier signal 277. This allows the receiver to provide the same readings at different initial phase conditions of the transmitter carrier signal 277.

Although the electrodes (e.g., lines 235 and 240) appear as lines in FIG. 2A, these electrodes may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3:
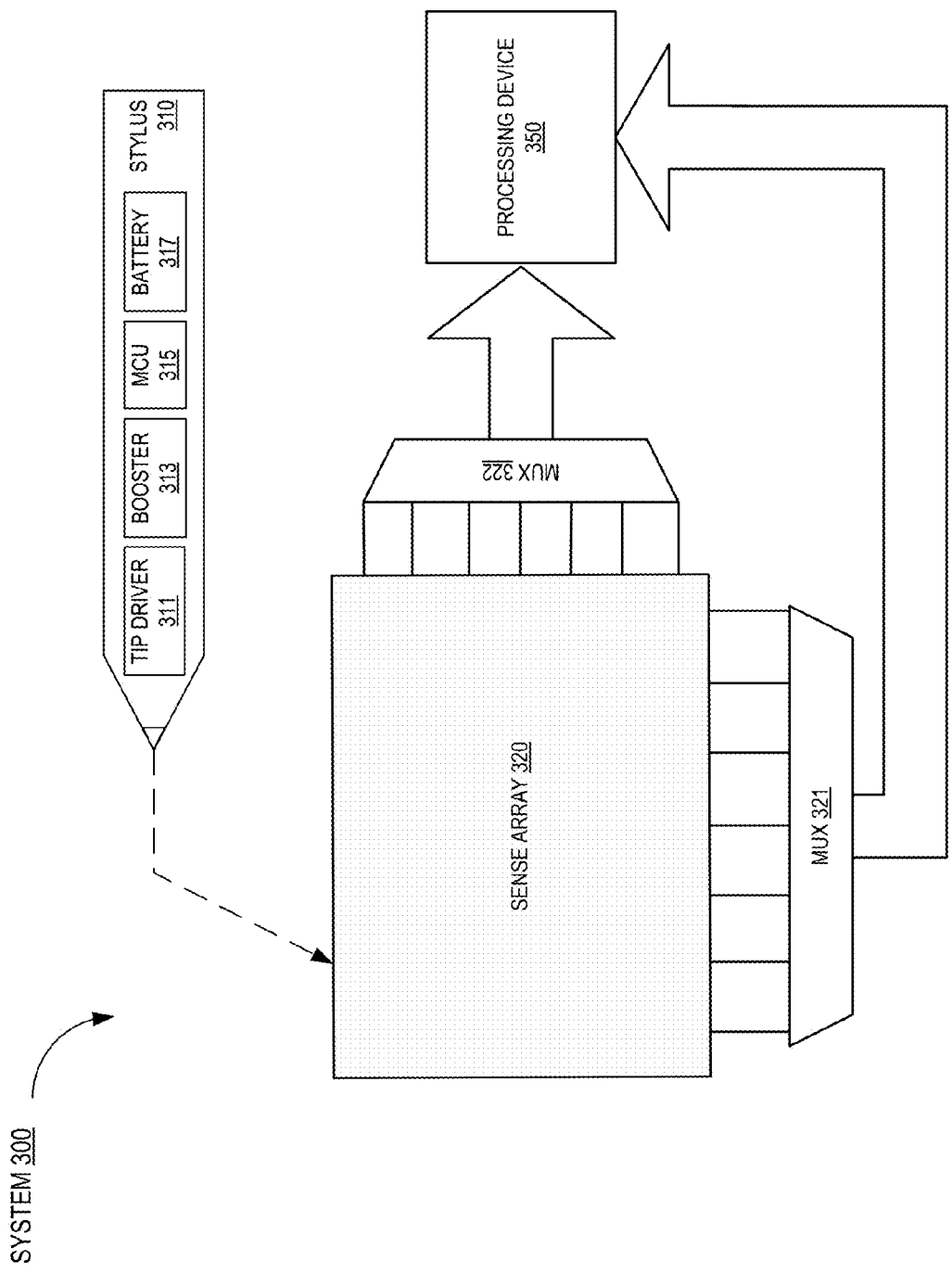
FIG. 3 is a block diagram illustrating a system according to one embodiment.

FIG. 3 is a block diagram illustrating a system 300 according to one embodiment. The system 300 includes a stylus 310, a sense array 320, a multiplexer (MUX) 321, a MUX 322, and a processing device 350 that converts measured signals to touch coordinates. The stylus 310 includes a tip driver 311, a booster 313, a microcontroller (MCU) 315, and a battery 317. In one embodiment, the stylus 310 may be an active stylus (e.g., a stylus that includes an internal power source or power supply, such as a battery). In another embodiment, the stylus 310 may be an unsynchronized stylus (e.g., the operation or timing of the stylus 310 may not be synchronized with the operation or timing of the sense array 320 or processing device 350). The MCU 315 may generate a stylus TX signal (such as TX signal 277 illustrated in FIG. 2B). In one embodiment, the MCU may be implemented using a combination of processing logic, state machines, and other circuitry. The MCU 315 may provide the TX signal to the tip driver 311 which provides the TX signal to the stylus tip where the TX signal is capacitively coupled to the sense array 320. The processing device 350 may sense this signal and may resolve this to be the point of the stylus 310. The booster 313 may increase or boost the strength of the TX signal generated by the tip driver 311. The battery 317 may provide power to the MCU 315 to generate the TX signal and may also be used to provide power to a booster 313, which may be used to increase the strength of the TX signal transmitted by the tip driver 311.

In one embodiment, the processing device 350 may be similar to a touch screen controller (such as touch screen controller illustrated in FIGS. 2A and 2B). In another embodiment, the processing device 350 may be similar to a capacitance sensor (such as capacitance sensor 101 illustrated in FIG. 1). The sense array 320 may include multiple electrodes that may be configured as TX electrodes or RX electrodes. The sense array 320 may include vertical electrodes (as illustrated in FIGS. 2A and 2B) and horizontal electrodes (as illustrated in FIGS. 2A and 2B). The processing device 350 may measure the TX signal transmitted by the stylus 310 using the electrodes in the sense array. The MUX 321 can be used to connect one or more of the vertical electrodes (e.g., 4, 8, 16, etc., vertical electrodes) to the processing device 350. The MUX 322 can be used to connect one or more of the horizontal electrodes e.g., 4, 8, 16, etc., horizontal electrodes) to the processing device 350. The processing device 350 may scan the electrodes that are connected by the MUXes 321 or 322, to detect the TX signal transmitted by the stylus 310. The MUXes 321 and 322 may connect any number of electrodes to the processing device 350.

In one embodiment, the processing device 350 may perform scans to detect the TX signal from the stylus 310 in two stages. During the first stage, the processing device 350 may scan all of the electrodes (e.g., perform a full scan of all horizontal and all vertical electrodes) in the sense array 320 to determine the location of the stylus 310 on the sense array 320. After determining the location (e.g., position) of the stylus 310, the processing device may proceed to a second stage, where the processing device identifies a subset of the electrodes in the sense array 320 and scans the subset of the electrodes to detect the TX signal transmitted by the stylus 310. In another embodiment, the processing device 350 may continually perform scans of subsets of the electrodes to detect the TX signal transmitted by the stylus 310. By scanning subsets of the electrodes, the processing device 350 may be able to track the movement or position of the stylus 310 more quickly or efficiently than performing full scan (e.g., a scan of all the electrodes in the sense array 320. In a further embodiment, the processing device 350 may estimate or predict the motion of the stylus 310 based on previous locations or positions of the stylus determined during previous scans. The processing device 350 may identify subsets of electrodes for the next scan, based on the estimated motion of the stylus 310. In one embodiment, the sense array 320 and the processing device 350 may switch from a first mode of operation which determines whether the stylus 310 is present (e.g., whether the TX signal from the stylus 310 is detected) to a second mode (e.g., a touch mode) of operation which may detected touch objects (e.g., conducted objects such as a finger). The sense array 320 and the processing device 350 may switch to the second mode of operation when the TX signal from the stylus 310 is no longer detected.

Figure 4:
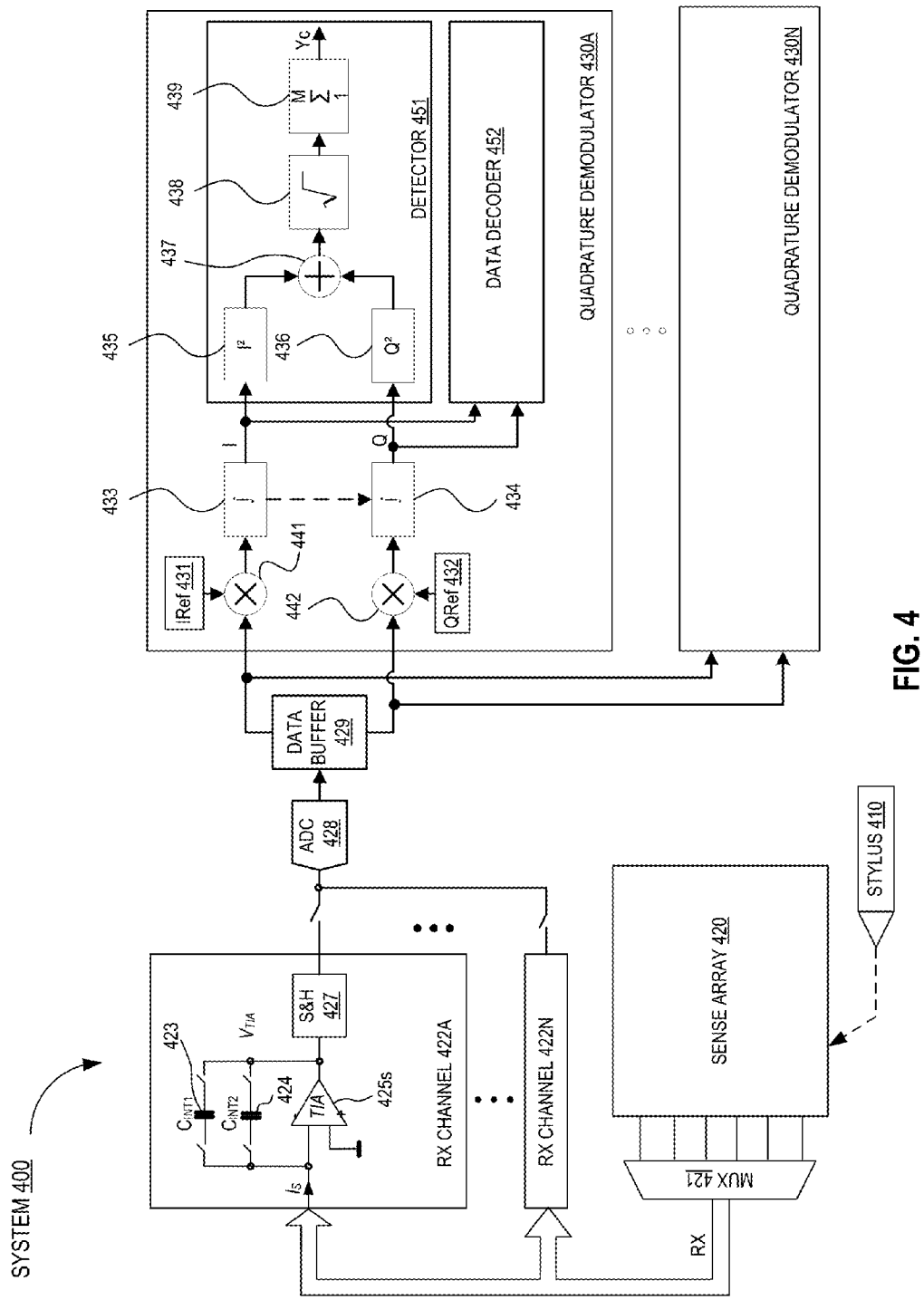
FIG. 4 is a block diagram illustrating a system according to another embodiment.

FIG. 4 is a block diagram illustrating a system 400 according to another embodiment. The system 400 includes a stylus 410, a sense array 420, a MUX 421, RX channels 422A through 422N, an ADC 428, a data buffer 429, and quadrature demodulators 430A through 430N. In one embodiment, the stylus 410 may be a synchronized stylus. In another embodiment, the stylus 410 may be an unsynchronized stylus (e.g., the operation or timing of the stylus 410 may not be synchronized with the operation or timing of the sense array 420. The stylus 410 may capacitively couple or transmit a TX signal to one or more electrodes in the sense array 420. The MUX 421 may connect one or more electrodes (e.g., 4 electrodes, 8 electrodes, etc.) to the RX channels 422A through 422N.

In one embodiment, each of the RX channels 422A through 422N may scan or sense an electrode in the sense array 420. The RX channel 422A receives an input signal $I_S$ from the electrode. The signal is provided to integrating capacitors 423 and 424 (e.g., integrating capacitors $C_{INT1}$ and $C_{INT2}$). The input signal $I_S$ is also provided to a trans-impedance amplifier (TIA) circuit 425. The output of the integrating capacitors 423 and 424 (e.g., integrating capacitors $C_{INT1}$ and $C_{INT2}$) is combined with the output of the TIA circuit 425 in two different stages. The first integrating capacitor 423 is coupled to the TIA circuit 425 at the first stage. The combined output of the integrating capacitor 423 and the TIA circuit 425 (from the first stage) is provided to sample and hold (S&H) circuit 427 which samples the output (e.g., the first output voltage or signal). The second integrating capacitor 424 is coupled to the TIA circuit 425 at the second stage. The combined output of the integrating capacitor 424 and the TIA circuit 425 (from the second stage) is provided to S&H circuit 427 which samples the output (e.g., the output voltage or signal). The S&H circuit 427 may determine the difference between the first output and the second output and may provide the difference (e.g., the voltage difference) to the output of the c 422A. The output of the RX channel 422A (e.g., the voltage difference) is provided to an analog-to-digital converter (ADC) 428. In one embodiment, the RX channel 422A may perform a current to voltage conversion of the input signal $I_S$. The RX channel 422A (e.g., the integrating capacitors 423 and 424, the TIA circuit 425) may also be referred to as a synchronous demodulator.

RX channels 422B through 422N may include components similar to RX channel 422A (e.g., integrating capacitors, an S&H circuit, etc.) and may perform operations, functions, or actions similar to RX channel 422A. Each of the RX channels 422B through 422N may also process an input signal (e.g., $I_S$) and may provide the output (e.g., a processed signal) to the ADC 428, similar to RX channel 422A. It should be understood that the system 400 may include any number of RX channels. For example, the system 400 may include four RX channels, sixteen RX channels, one hundred RX channels, etc.

The ADC 428 may convert an analog signal (e.g., a wave or curved signal) received from the RX channel 422A into a digital signal (e.g., a square signal). The ADC 428 provides the converted digital signal to a data buffer 429 which may store the converted digital signal (e.g., may store the "0" and "1" values of the digital signal). In one embodiment the ADC 428 may sample the output of the RX channel 422A one or more frequencies (e.g., 600 Hz or 600 times a second, 300 kHz or 300,000 times a second, etc.). In one embodiment (not shown in the figures), each RX channel 422A through 422N may be coupled to a different ADC (e.g., each RX channel has its own ADC).

The digital signal stored in the data buffer 429 may be provided to quadrature demodulators 430A through 430N. Quadrature demodulator includes multipliers 441 and 442, integrators 433 and 434, a detector 452, and a data decoder 452. Multiplier 441 multiples the digital signal by an in-phase sequence IRef 431 and multiplier 442 multiples the digital signal by a quadrature sequence QRef 432. The in-phase sequence IRef 431 and the quadrature sequence QRef 432 may be used to obtain or separate an in-phase component and a quadrature phase component from the digital signal received from the data buffer 429. The in-phase sequence IRef 431 and the quadrature sequence QRef 432 may be sequences of numerical values (e.g., the sequence of integers [−1, 1, 1, −1] or the sequence of non-integers [0.38, 0.92, −0.92, 0.92, −0.38, −0.38, 0.92, 0.38], etc.). The in-phase component of the digital signal is provided to integrator 433 which generates the value I and the quadrature component of the digital signal is provided to integrator 434 which generates the value Q. In one embodiment, the integrators 433 and 434 may be low-pass filters. The values I and Q are provided to detector 451 and data decoder 452.

The detector 451 may process the I and Q values to obtain a value or result $Y_C$. The detector 452 includes power square units 435 and 436. Power square unit 435 may square the value I and power square unit 436 may square the value Q. The square values $I^2$ and $Q^2$ may then be summed using adder 437 and the sum is provided to the square root circuit 438. The square root circuit 438 calculates a square root of the summed value and provides the square root value to an averaging circuit 439. The averaging circuit 439 may obtain an average of multiple square root values to determine a result $Y_C$. The result $Y_C$ may be transferred, e.g., for stylus touch detection and stylus touch coordinate calculation.

The data decoder 452 may process the I and Q values to decode or demodulate stylus data from the digital signal received from the data buffer 429. For example, the one or more of the in-phase component or the quadrature component of the digital signal may encode stylus data such as battery data (e.g., data indicative of the battery level or power level of the stylus 410), acceleration data (e.g., data indicative of an acceleration of the stylus 410), button data (e.g., data indicative of whether a button is pressed or a length of time a button is pressed), or force data (e.g., data indicative of an amount of force or pressure on the tip the stylus 410). In one embodiment, stylus data may include any data or information transmitted by the stylus 410. In other embodiments, other types of data may be decoded from the digital signal by the data decoder 452. In one embodiment, the same data or signal received from the RX channel 422A (via the ADC 428 and the data buffer 429) may be processed by the data decoder 452 to decode or demodulate the stylus data (e.g., force data, button data, etc.) This may allow the quadrature demodulator 430A to simultaneously detect the presence of the stylus 410 proximate to the sense array 420 (e.g., near or in contact with the sense array 420) and decode data transmitted by the stylus 410.

Quadrature demodulators 430B through 430N may include components that are similar to the components in quadrature demodulator 430A (e.g., multipliers, integrators, power square units, etc.) and may perform functions, operations or actions similar to quadrature demodulator 430A. It should be understood that the in other embodiments, the system 400 may include any number of quadrature demodulators. For example, the system 400 may include four quadrature demodulators, 24 quadrature demodulators, etc. In one embodiment, the system 400 may include one quadrature demodulator for each RX channel (e.g., the number of quadrature demodulators is equal to the number of RX channels). In one embodiment, the quadrature demodulators 430A through 430N may be part of a processing device or a touch screen controller (as illustrated in FIGS. 1, 2A, and 2B). In another embodiment, the operations, functions, or actions of the quadrature demodulators 430A through 430 may be performed by a processing device or a touch screen controller.

In one embodiment, the quadrature demodulators 430A through 430N may allow a capacitive sense array 420 to detect the presence of both a finger and unsynchronized stylus using a receiver having two different modes of operation or simultaneously by adding an additional parallel processing channel to receiver. The additional parallel processing channel may allow the receiver to simultaneously process different signals with different frequencies using the same data stream from the ADC 428. The different sensing modes (i.e., finger sensing and stylus sensing) differ in the cycle-by-cycle post-processing options. Since the sensing engine operation is not changed, the fundamental capacitance sensing channel setup does not change for the different modes. Using different post-processing algorithms or options (e.g. using the different demodulation sequences) for the same data stream allows potentially implementing fully parallel stylus and touch sensing, as parallel processing channels allow building receivers with different center frequencies. The only change is that all of the electrodes in the sense array 420 are connected to receiver inputs in the stylus scanning mode (rather that the rows being connected to a transmitter). Then the parallel data processing allows stylus and touch detection at coordinates where the receiving electrodes are connected. In one embodiment, however, upon detection of a stylus proximate to the sense array 420, the sense array 420, may switch to a stylus only sensing mode, which may eliminate any interference due to the possible presence of even harmonics in any stylus transmitter signal.

Figure 5:
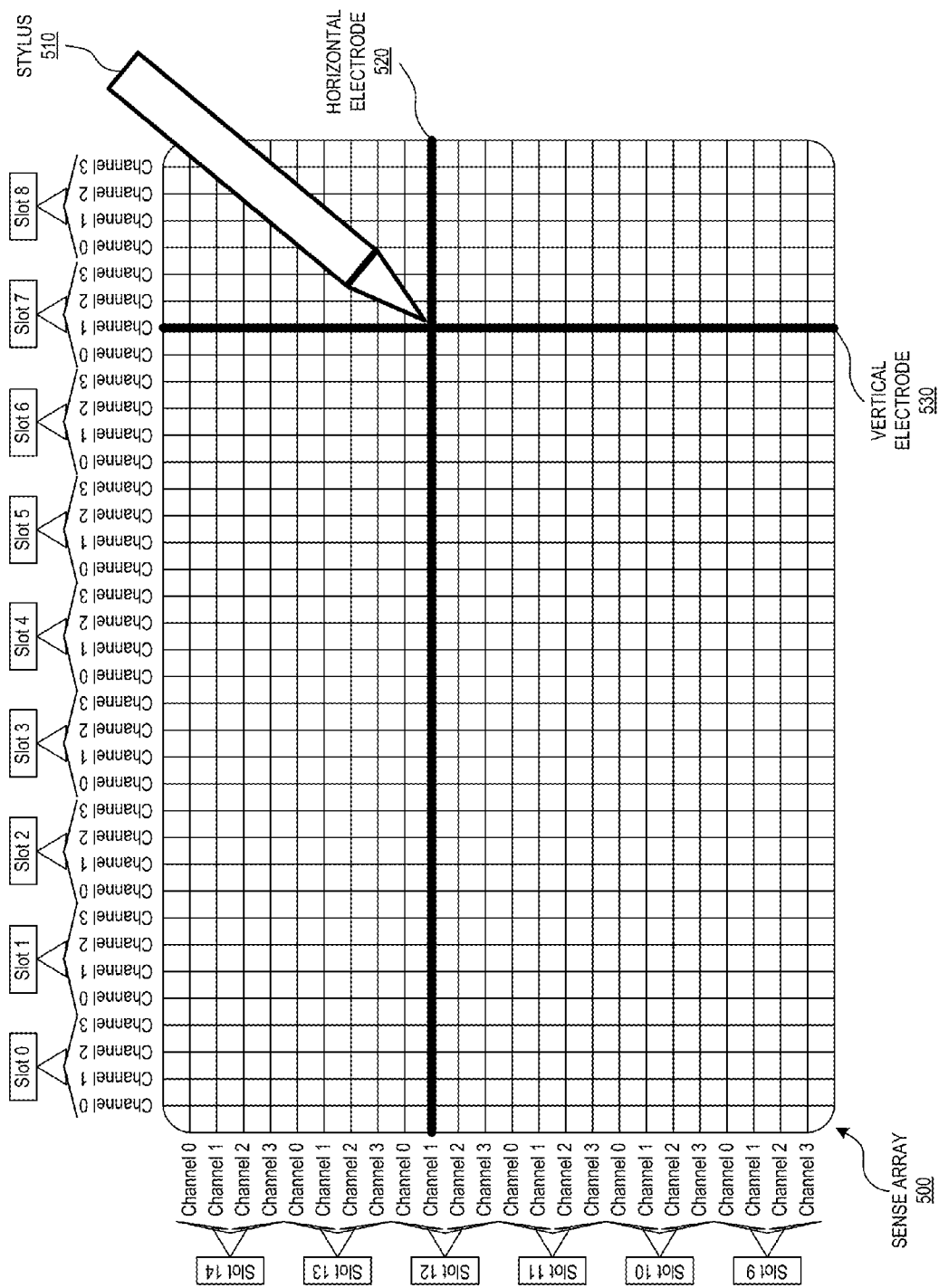
FIG. 5 is a diagram illustrating a full scan of a sense array, according one embodiment.

FIG. 5 is a diagram illustrating a full scan of a sense array 500, according one embodiment. The sense array 500 includes thirty-six vertical electrodes and twenty-four horizontal electrodes. The thirty-six vertical electrodes are grouped into nine groups or slots, such as slots 0 through 8, of four electrodes each. The four electrodes in each of slot 0 through slot 8 are labeled channel 0, channel 1, channel 2, and channel 3. The twenty-four horizontal electrodes are grouped into six groups or slots, such as slots 9 through 14, of four electrodes each. The four electrodes in each of slot 9 through slot 14 are also labeled channel 0, channel 1, channel 2, and channel 3.

The number of electrodes in each of slot 0 through slot 14 may be based on the number of RX channels that are available to scan the electrodes of the sense array 500. For example, a system may have four RX channels (e.g., four receivers) to scan the electrodes of the sense array 500. Each receiver may scan one electrode at a time and four electrodes may be scanned simultaneously. As illustrated in FIG. 5, there may be four RX channels available. This may allow the processing device to simultaneously scan four electrodes at a time the electrodes. In other embodiments, the processing device may scan multiple slots simultaneously based on a whether there are enough RX channels to support scanning of multiple slots. For example, if there are eight RX channels available, the processing device may scan slots 0 and 1 simultaneously, slots 2 and 3 simultaneously, etc. In other embodiments, the number of slots and the number of electrodes in each slot may vary based on the number of available RX channels and the number of electrodes in the sense array 500. For example, if there are one hundred vertical electrodes and five available RX channels, the vertical electrodes may be divided into twenty groups or slots five electrodes each. In another example, if there are seventy-two horizontal electrodes and nine available RX channels, the horizontal electrodes may be divided into eight groups or slots nine electrodes each.

In one embodiment, when performing a full scan of the sense array 500, a processing device (as illustrated in FIGS. 1 and 3) may scan each slot sequentially. For example, the processing device may scan the four electrodes in slot 0 first, then the four electrodes in slot 1, then the four electrodes in slot 3, etc. As the processing device scans each slot, the processing device may process data obtained from scanning the previous slot and may also prepare the next slot for scanning. For example, as the processing device scans slot 4, the processing device may process data received from scanning slot 3 and may also prepare the sense array 500 for the next scanning of slot 5 (e.g., may configured multiplexers to connect to the electrodes in slot 5). After scanning the slots 0 through 14 (e.g., after scanning all of the electrodes), the processing device may determine whether any of the electrodes received a TX signal from the stylus 510. The processing device may identify a horizontal electrode 520 where the TX signal from the stylus 510 was the strongest and a vertical electrode 530 where the TX signal from the stylus 510 was the strongest. In other embodiments, the processing device may identify multiple horizontal electrodes or multiple vertical electrodes where the TX signal from the stylus 510 was the strongest.

Figure 6A:
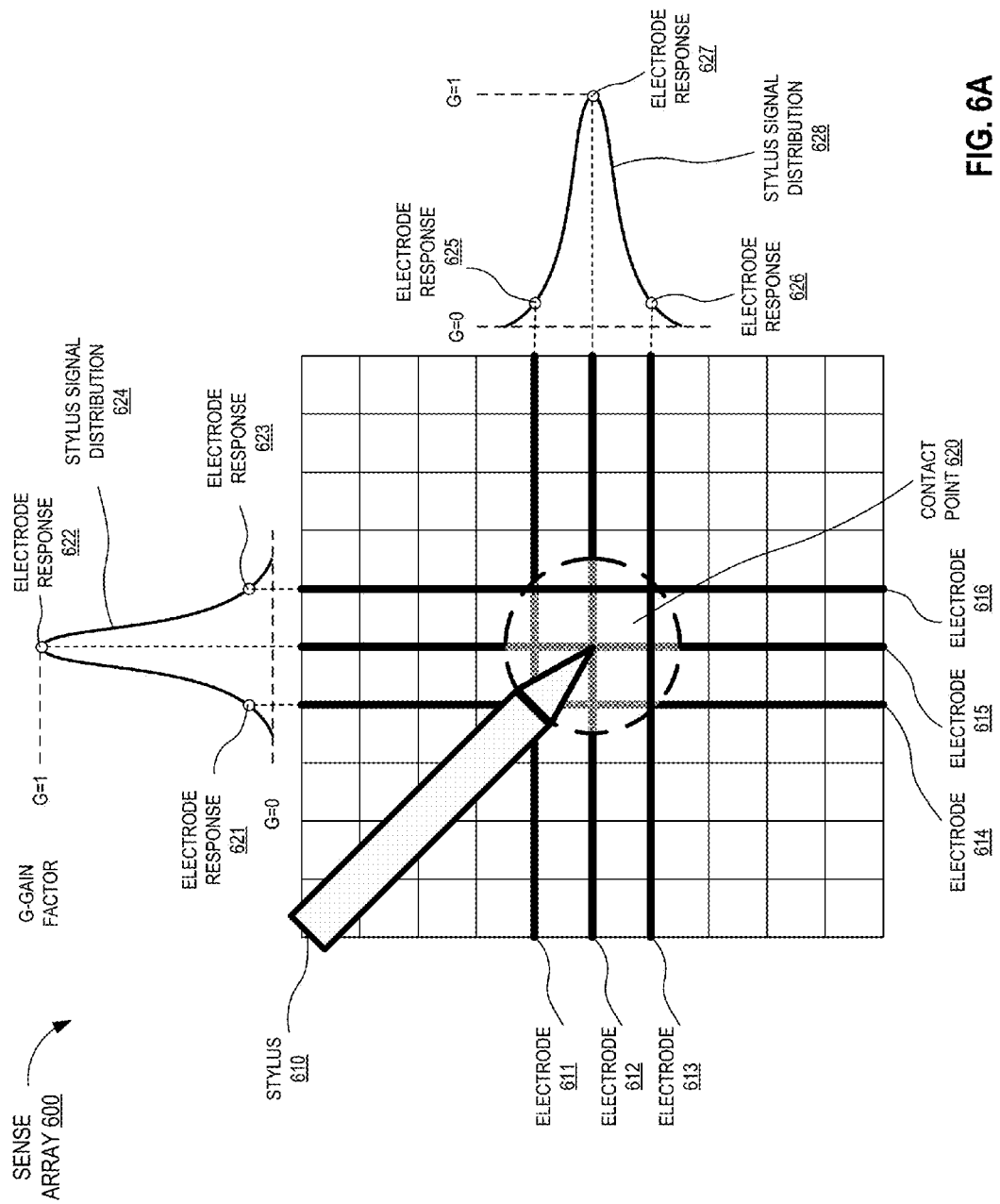
FIG. 6A is a diagram illustrating a sense array where a stylus is positioned at an intersection between two electrodes of the sense array, according to an embodiment.

FIG. 6A is a diagram illustrating a sense array 600 where a stylus 610 is positioned at an intersection between two electrodes 612 and 615 of the sense array 600, according to an embodiment. The sense array 600 includes horizontal and vertical electrodes. Contact point 620 illustrates a first example area where the tip of a stylus 610 (e.g., a synchronized or unsynchronized stylus) may capacitively couple a signal onto one or more of the electrodes in the sense array 600. As illustrated in FIG. 6A, the stylus is located at the intersection of the electrodes 612 and 615. The contact point 620 spans three vertical electrodes 614, 615, and 616, and three horizontal electrodes 611, 612, and 613. Thus, the TX signal from the stylus may be received by three horizontal electrodes and three vertical electrodes at the contact point 620.

FIG. 6A also includes two graphs that illustrate the gain factor (G) of the TX signal received from the stylus at electrodes 611 through 616. The first graph includes a stylus distribution signal 624. The stylus distribution signal 624 illustrates that the electrode 615 has an electrode response 622 (e.g., has a gain factor of 1), electrode 614 has an electrode response 621 (e.g., has a gain factor of around 0.1), and the electrode 616 has an electrode response 623 (e.g., has a gain factor of around 0.1). As illustrated by the stylus distribution signal 624, the gain factor is strongest at electrode 615 because the electrode 615 is the vertical electrode that is at the center of the contact point 620. The second graph includes a stylus distribution signal 628. The stylus distribution signal 628 illustrates that the electrode 612 has an electrode response 627 (e.g., has a gain factor of 1), electrode 611 has an electrode response 625 (e.g., has a gain factor of around 0.1), and the electrode 613 has an electrode response 626 (e.g., has a gain factor of around 0.1). As illustrated by the stylus distribution signal 628, the gain factor is strongest at electrode 612 because the electrode 612 is the horizontal electrode that is at the center of the contact point 620. As illustrated in the stylus distribution signals 624 and 628, when the stylus is located at the intersection of the electrodes 612 and 615, the stylus distribution signals 624 and 628 the strongest electrode response at the center electrodes (e.g., electrodes 612 and 615) and relatively lower electrode responses from the electrodes located next to the center electrodes (e.g., electrodes 611, 613, 614, and 616).

Figure 6B:
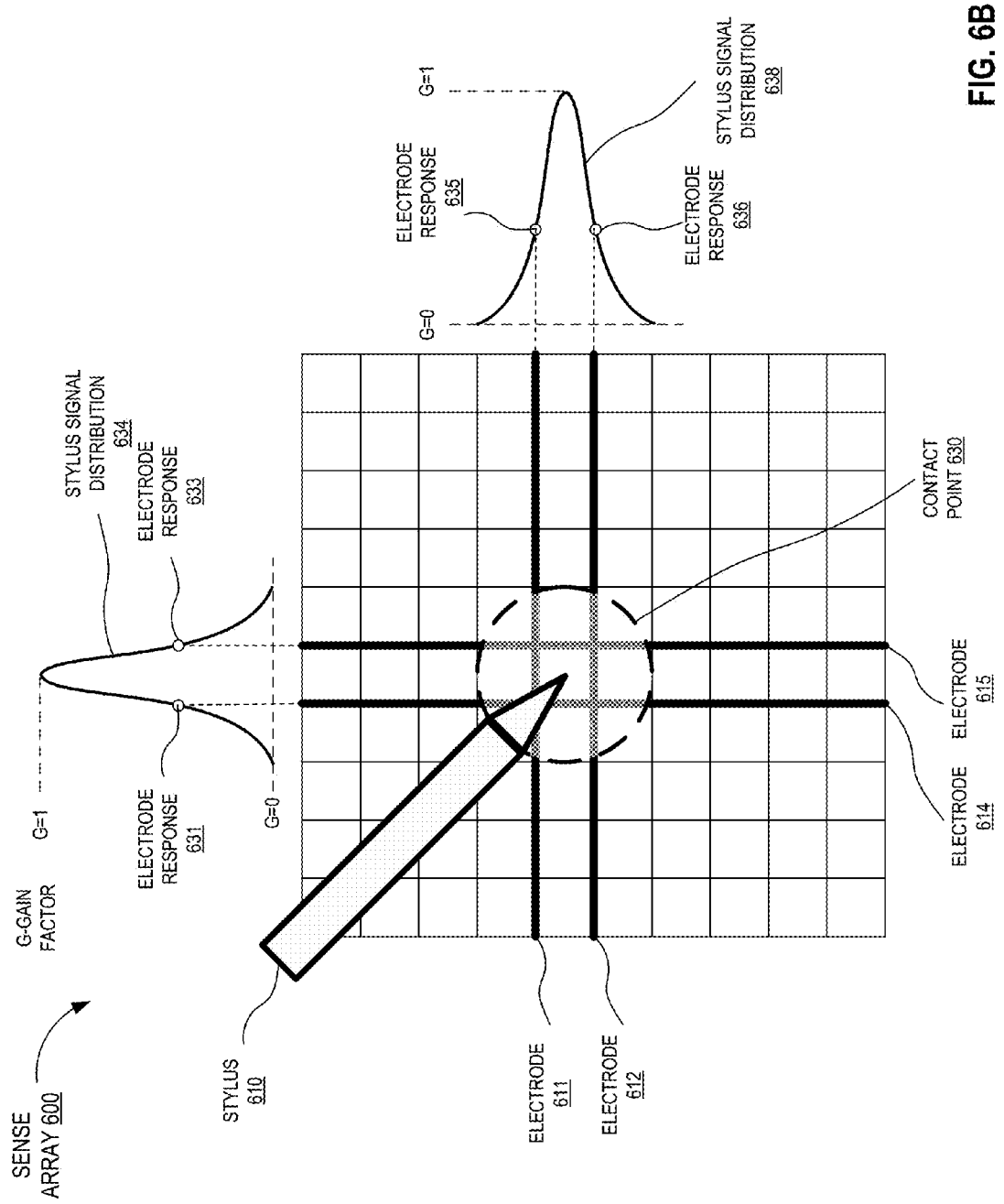
FIG. 6B is a diagram illustrating a sense array where a stylus is positioned at center of square, formed by four electrodes of the sense array, according to another embodiment.

FIG. 6B is a diagram illustrating a sense array 600 where a stylus is positioned at center of square, formed by four electrodes 611, 612, 614, and 615 of the sense array 600, according to another embodiment. Contact point 630 illustrates a second example area where the tip of a stylus 610 (e.g., a synchronized or unsynchronized stylus) may capacitively couple a signal onto one or more of the electrodes in the sense array 600. The contact point 630 spans two vertical electrodes 614 and 615, and two horizontal electrodes 611 and 612. Thus, the TX signal from the stylus may be received by two horizontal electrodes and two vertical electrodes at the contact point 630.

FIG. 6B also includes two graphs that illustrate the gain factor (G) of the TX signal received from the stylus at electrodes 611, 612, 614, and 615. The first graph includes a stylus distribution signal 634. The stylus distribution signal 634 illustrates that the electrode 614 has an electrode response 631 (e.g., has a gain factor of about 0.5) and that the electrode 615 has an electrode response 633 (e.g., has a gain factor of around 0.5). As illustrated by the stylus distribution signal 634, the gain factor is strongest in the center of electrodes 614 and 615 because the center of the electrodes 614 and 615 is the center of the contact point 630. The second graph includes a stylus distribution signal 638. The stylus distribution signal 638 illustrates that the electrode 611 has an electrode response 635 (e.g., has a gain factor of about 0.5) and that the electrode 612 has an electrode response 636 (e.g., has a gain factor of around 0.5). As illustrated by the stylus distribution signal 638, the gain factor is strongest in the center of electrodes 611 and 612 because the center of the electrodes 611 and 612 is the center of the contact point 630. In one embodiment, the signal strength from electrodes outside touch area may be relatively small and may not used for the stylus touch position calculation. Therefore, regardless stylus position on screen, stylus transmit a signal to a few electrodes (e.g., 2-3 electrodes) for each axis (e.g., for the X-axis or the Y-axis).

In one embodiment, because the stylus may capacitively couple a signal onto a certain number of electrodes simultaneously (e.g., 2-3 electrodes on the X-axis or Y-axis as illustrated in FIGS. 6A and 6B), the processing device may perform a second scan or (e.g., a fast scan or a reduced scan) on groups of electrodes that are around the electrodes 611 through 613 (illustrated in FIG. 6A), or that are around the electrodes 614 and 615. For example, the processing device may scan a group of horizontal electrodes that are above the electrode 611. In another example, the processing device may scan a group of vertical electrodes that are to the left of the electrode 614. In other embodiments, the contact areas may capacitively couple a signal onto a different number of electrodes simultaneously, based on one or more of the size of the tip of the stylus and the spacing between the electrodes in the sense array 605. For example, if the tip of the stylus is larger, the contact area 620 may span five electrodes. In another example, if the spacing between the electrodes is smaller, the contact area 630 may span more electrodes.

Figure 7:
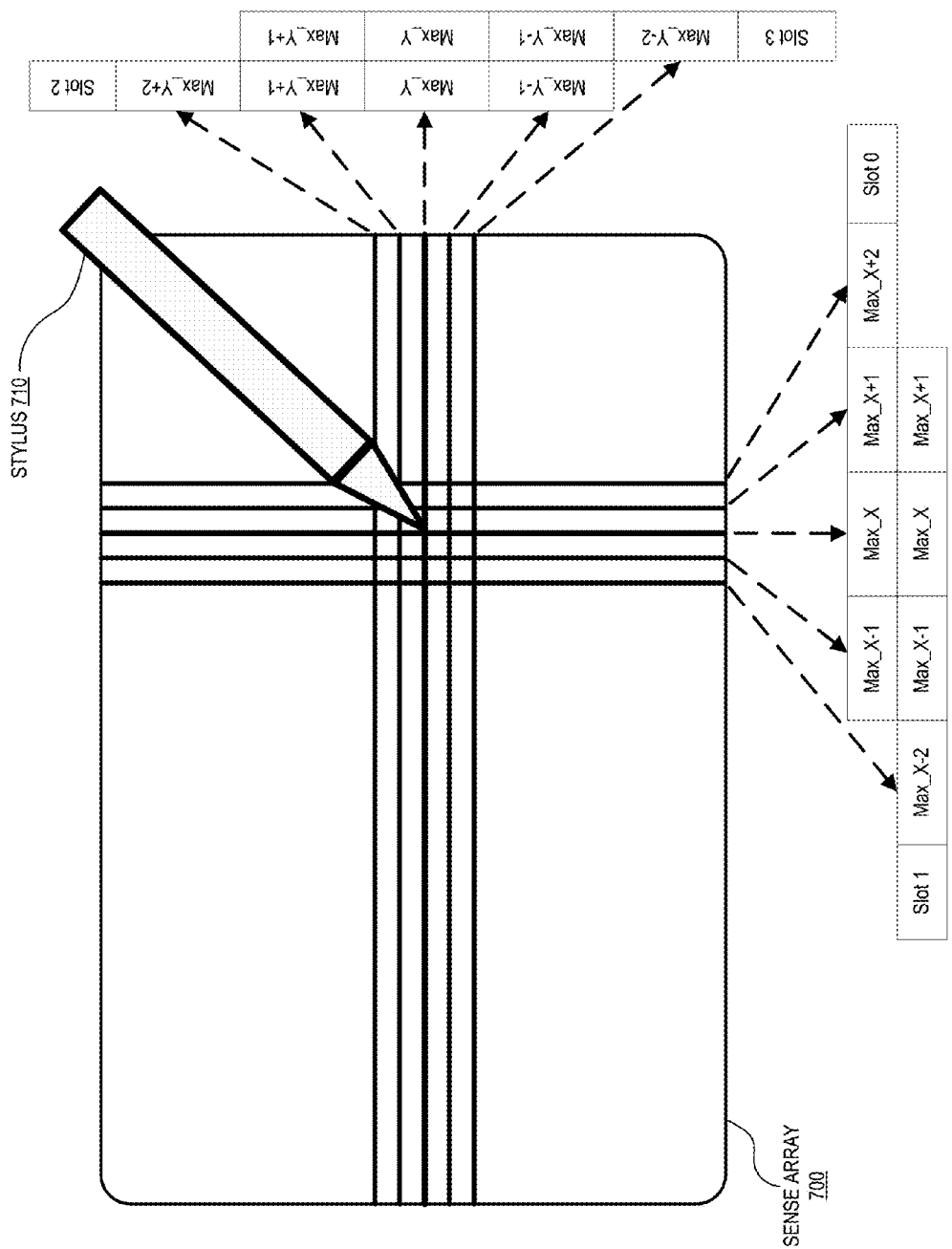
FIG. 7 is a diagram illustrating a reduced or fast scan of a sense array, according one embodiment.

FIG. 7 is a diagram illustrating a reduced or fast scan of a sense array 700, according one embodiment. The reduced or fast scan (e.g., a second scan) illustrated in FIG. 7 may be performed after a stylus TX signal is detected by a full scan (e.g., a first scan), as illustrated in FIG. 5. The sense array 700 includes vertical electrodes and horizontal electrodes. The full scan illustrated in FIG. 5 may identify one or more vertical electrodes and one or more horizontal electrodes where the TX signal from the stylus 710 is the strongest. The full scan may determine that the electrode vertical electrode Max_X and the horizontal electrode Max_Y are electrodes where the TX signal from the stylus 710 is the strongest based on the full scan (e.g., the first scan) illustrated in FIG. 5.

Based on the full scan, a processing may identify subsets (e.g., slots) of the electrodes in the sense array 700. As illustrated in FIG. 7, the processing device may identify slot 0, slot 1, slot 2, and slot 3. Slot 0 includes the electrodes Max_X−1, Max_X, Max_X+1, and Max_X+2. Slot 1 includes the electrodes Max_X−2, Max_X−1, Max_X, and Max_X+1. Slot 2 includes the electrodes Max_Y−1, Max_Y, Max_Y+1, and Max_Y+2. Slot 2 includes the electrodes Max_Y−2 Max_Y−1, Max_Y, and Max_Y+1. The processing device may scan slot 0 through slot 4 (e.g., subsets of electrodes) to perform reduced or faster scanning in order to detect the location of the stylus 710. In one embodiment, the processing device may scan slot 0 through slot 4 sequentially. For example, the processing device may scan slot 0, then scan slot 1, etc.

Slot 0 and slot 1 may include some of the same electrodes (e.g., may include overlapping electrodes). For example, both slot 0 and slot 1 include electrodes Max_X−1, Max_X, and Max_X+1. Slot 2 and slot 3 may also include some of the same electrodes (e.g., may also include overlapping electrodes). For example, both slot 2 and slot 3 include electrodes Max_Y−1, Max_Y, and Max_Y+1. By identifying slots with overlapping electrodes, the processing device may reduce the amount of noise detected on the electrodes in the slots and may improve the signal-to-noise ratio (SNR) of the TX signal detected from the stylus 710. In some embodiments, the different slots 0 through 3 may not include the same electrodes. For example, slot 0 may include one group of electrodes and slot 1 may include a second group of completely different electrodes. Based on the movement speed or direction of the stylus 710, the processing device may identify slots that have fewer or more overlapping electrodes. For example, if the processing device determines that the stylus 710 is moving quickly to the right (based on previous full scans or previous fast scans), the processing device may identify slots which do not overlap, in order to detect the TX signal from the stylus 710 over a larger number of electrodes. In another example, if the processing device determines that the stylus is moving at a slower speed, the processing device may identifier slots which have overlapping electrodes in order to improve the SNR of the TX signal received from the stylus 710.

In one embodiment, the slots identified by the processing device for the fast or reduced scan may be the same as the slots used during the full scan (as illustrated in FIG. 5). In another embodiment, the slots identified by the processing device for the fast or reduced scan may be different from the slots used during the full scan. In one embodiment, the number of electrodes in the slots for the reduced or fast scan may be based on one or more of the number of receive channels available, the size of the tip of the stylus, the spacing between the electrodes in the sense array 700, and the movement of the stylus 710 (e.g., speed or direction of the stylus 710). It should be understood that in other embodiments, the processing device may use any number of slots when performing the fast or reduced scanning (e.g., the second scan or additional scans). For example, the processing device may use slot 0 and slot 2 when performing the fast or reduced scan. In another example, the processing device may use slot 0, slot 1, and slot 3 when performing the fast or reduced scan. In a further example, the processing device may use three slots (e.g., groups) of vertical electrodes and three slots (e.g., groups) of horizontal electrodes when performing the fast or reduced scan.

In one embodiment, full scans (as illustrated in FIG. 5) and fast or reduced scans (e.g., tracking scans as illustrated in FIG. 7) may use different sets of parameters, such as integration time per slot and individual thresholds. This is because the different scan types may have different requirements for the stylus position detection. For example, the full scan may be used for coarser stylus detection and therefore may have lower requirements for the signal-to-noise ratio. This may result in a shorter slot integration time (e.g. 100 us) for the full scan. The tracking scan (e.g., fast or reduced scan) results are used to determine a more precise location for the stylus 710 and may require better signal to noise ratio and a longer slot integration time (e.g. 300 us). Increasing the slot integration time may reduce the channel passband and may also improve noise immunity.

In one embodiment, the processing device may continually perform fast (tracking) or reduced scans (e.g., may perform additional scans) until the TX signal from the stylus 710 is no longer detected. For example, the processing device may continually perform the fast or reduced scans until the user lifts the stylus 710 away from the sense array 700 such that the stylus can no longer capacitively couple the TX signal to one or more electrodes in the sense array 700. In another embodiment, during the continual fast or reduced scans, the processing device may analyze the positions of the stylus 710, which are determined based on previous fast or reduced scans, to estimate or approximate one or more of the direction of movement of the stylus 710 and the speed of the movement of the stylus 710. For example, the locations determined from previous continual fast or reduced scans may indicated that the stylus 710 is moving in an upwards and left direction. Based on the previous locations, the processing device may estimate that the stylus 710 will continue moving in the upwards and left direction. The processing device may identify slots of electrodes (e.g., groups of electrodes) that are upwards and left of the current location of the stylus 710, for the next fast or reduced scan. This may allow the processing device to scan few electrodes and still be able to detect the TX signal transmitted by the stylus 710. In other embodiments various algorithms, functions, or methods may be used to identify slots of electrodes for a subsequent fast scan. For example, an algorithm may use trajectory analysis (e.g., analyze the previous motion of the stylus 710) in combination with signal strength analysis (e.g., analyze the signal strength of signals received by electrodes). Such algorithms, functions or methods may provide benefit such as being able to better detect fast movement of the stylus 710. For example, the algorithm may be able to recognize that the stylus is moving in a shape or pattern that is similar to a user's signature.

Figure 8:
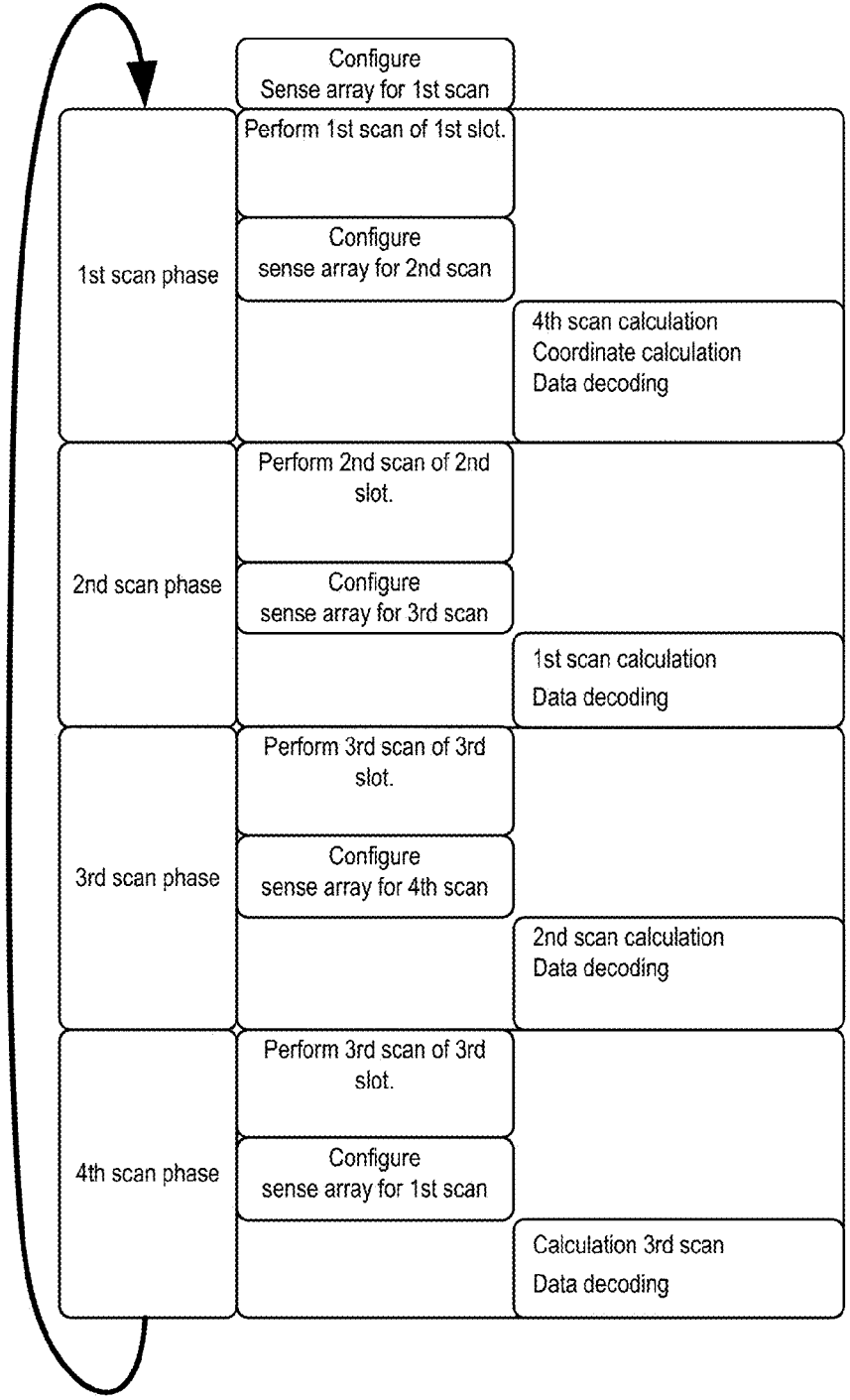
FIG. 8 is chart illustrating operations that may be performed by a processing device during a fast or reduced scan.

FIG. 8 is chart 800 illustrating operations that may be performed by a processing device during a fast or reduced scan that uses four slots (as illustrated in FIG. 7). As illustrated in the chart 800, the processing device may configure the sense array for a first scan of a first slot. For example, the processing device may configure a MUX to connect the electrodes in the first slot to RX channels or the processing device. The processing device may then proceed to the first scan phase, where the processing device performs the first scan. The processing device also configures the sense array for a second scan of a second slot. For example, the processing device may configure a MUX to connect the electrodes in the second slot to RX channels or the processing device. In the last portion of the first scan phase, the processing device may process or calculate data that was received during a previous scan (if there was a previous scan of a fourth slot). The processing device may also determine the coordinates (e.g., the location) of the stylus or estimate the motion (e.g., speed, direction, acceleration) of the stylus based on data processed from previous scans (if there were previous scans). The processing device may further decode data (e.g., force data, battery data, etc.) received from the stylus (as discussed above in conjunction with FIG. 4). The processing device may then proceed to the second scan phase, where the processing device performs the second scan. The processing device also configures the sense array for a third scan of a third slot. For example, the processing device may configure a MUX to connect the electrodes in the third slot to RX channels or the processing device. In the last portion of the second scan phase, the processing device may process or calculate data that was received during the first scan. The processing device may also decode data (e.g., force data, battery data, etc.) received from the stylus (as discussed above in conjunction with FIG. 4).

The processing device may then proceed to the third scan phase, where the processing device performs the third scan. The processing device also configures the sense array for a fourth scan of a fourth slot. For example, the processing device may configure a MUX to connect the electrodes in the fourth slot to RX channels or the processing device. In the last portion of the third scan phase, the processing device may process or calculate data that was received during the second scan. The processing device may also decode data (e.g., force data, battery data, etc.) received from the stylus (as discussed above in conjunction with FIG. 4). The processing device may then proceed to the fourth scan phase, where the processing device performs the fourth scan. The processing device also configures the sense array for a first scan of a first slot. For example, the processing device may configure a MUX to connect the electrodes in the first slot to RX channels or the processing device. In the last portion of the fourth scan phase, the processing device may process or calculate data that was received during the third scan. The processing device may also decode data (e.g., force data, battery data, etc.) received from the stylus (as discussed above in conjunction with FIG. 4). After the fourth scan phase, the processing device may proceed back to the first scan phase.

In one embodiment, the processing device may not proceed back to the first scan phase after the fourth scan phase, if the processing device determines that the stylus is not longer proximate to the sense array (e.g., a TX signal is not longer received form the stylus). In another embodiment, the processing device may not proceed from one phase to the next phase if the processing device determines that the stylus is not longer proximate to the sense array (e.g., a TX signal is not longer received form the stylus). For example, the processing device may not proceed from the second scan phase to the third scan if the processing device determines during the second scan phase that the stylus is no longer proximate to the sense array.

Figure 9:
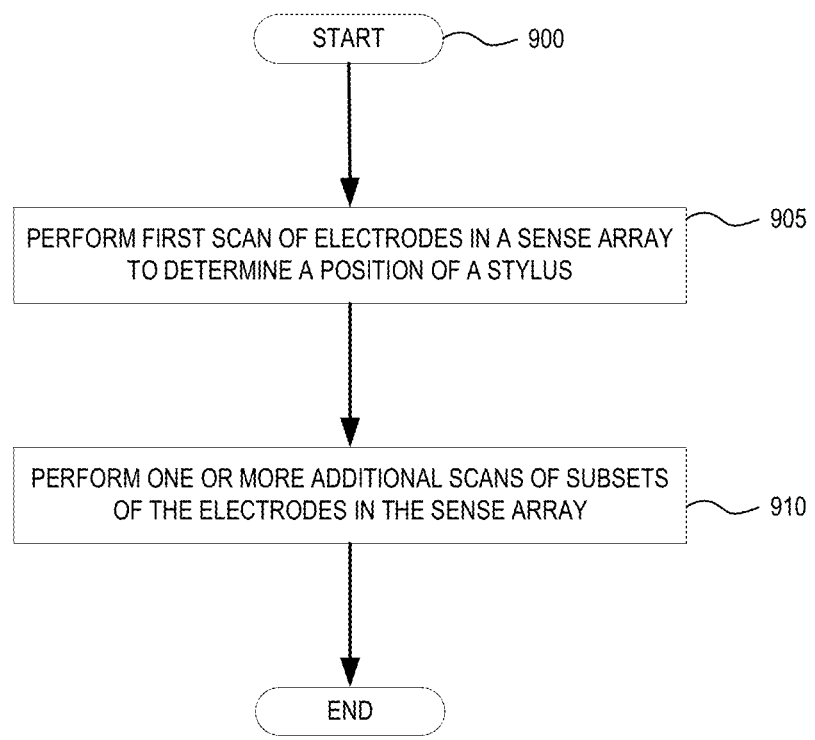
FIG. 9 is a flow chart of one embodiment of a method of detecting a stylus.

FIG. 9 is a flow chart of one embodiment of a method 900 of detecting a stylus. The method 900 may be performed by a host device that comprises hardware (e.g., circuitry, electrodes, switches, dedicated logic, programmable logic, microcode), software (e.g., instructions run on a processing device to perform hardware simulation), or a combination thereof. In one embodiment, method 900 may be performed by processing device 110 as illustrated in FIG. 1.

The method 900 begins with the host device performing a first scan of electrodes in the sense array to determine the position of the stylus at block 905. In one embodiment, the host device may perform a scan of all the electrodes in the sense array (e.g., may perform a full scan). In another embodiment, the host device may perform the first scan by dividing the electrodes in the sense array into slots or groups, and scanning each of the slots or groups (as illustrated in FIG. 5). At block 910, the host device may perform one or more additional scans (e.g., perform additional fast or reduced scans) of subsets of the electrodes in the sense array (as illustrated in FIG. 7). In one embodiment, the host device may identify the subsets for the one or more additional scans based on an estimated motion of the stylus based on previous locations determined from previous scans.

Figure 10:
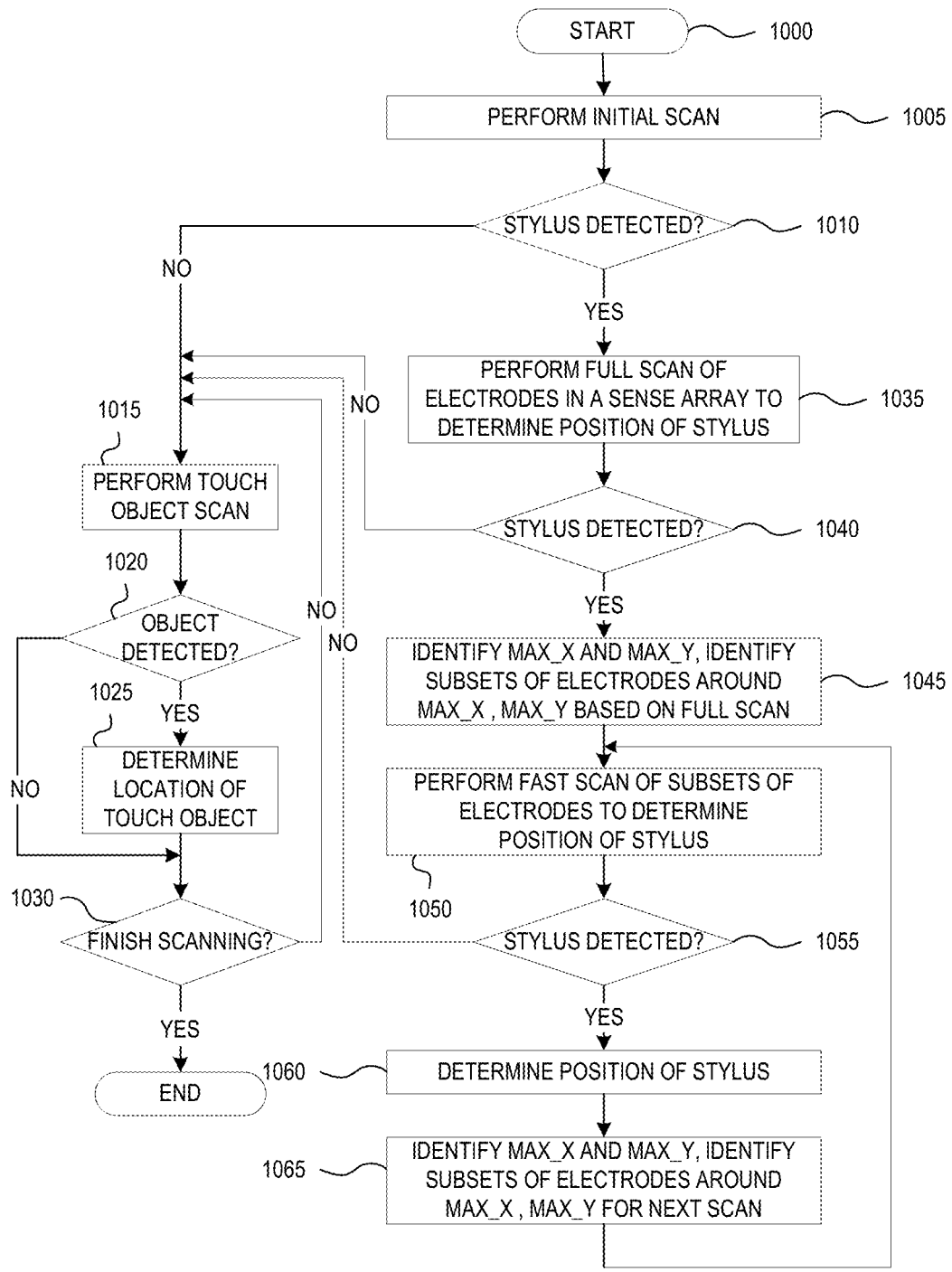
FIG. 10 is a flow chart of another embodiment of a method of detecting a stylus.

FIG. 10 is a flow chart of another embodiment of a method 1000 of detecting a stylus. The method 1000 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 1000 may be performed by processing device 110 as illustrated in FIG. 1.

The method 1000 begins with the host device performing an initial scan to detect a stylus at block 1005. For example, the host device may scan all of the electrodes in a sense array for a TX signal from a stylus. At block 1010, the host device determines whether a stylus is detected. For example, the host device may determine whether the strength of any signals from any of the electrodes is greater than a certain threshold or value (e.g., whether a signal strength from an electrode is above a certain value). If a stylus is not detected, the host device may switch to operating in a second mode, where the host device scans for touch objects (e.g., passive touch objects, such as a conductive object, a passive stylus, a finger, etc.) at block 1015. At block 1020, the host device determines whether a touch object is detected. If a touch object is detected, the host device may determine the location of the touch object (e.g., the location where the touch object is touching or is proximate to the sense array) at block 1025. If no touch object is detected, the host device may proceed to block 1030. At block 1030, the host device may determine whether to continue scanning (e.g., whether scanning has finished). A host device may stop or discontinue scanning if a user powers down the host device or the host device determines that the host device should enter a reduce power mode (e.g., a mode where the host device uses less power). If the host device has finished scanning, the method 1000 ends. If the host device has not finished scanning, the host device proceeds back to block 1015.

Referring back to block 1010, if a stylus is detected the host device proceeds to block 1035, where the host device performs a full scan (e.g., a first scan) of the electrodes in the sense array to determine the position of the stylus (as illustrated in FIG. 5). At block 1040, the host device determines whether a stylus is detected, if the stylus is not detected, the host device proceeds to block 1015. If the stylus is detected, the host device identifies one or more subsets of electrodes based on the full scan. For example, based on the full scan, the host device may identify the one or more vertical electrodes (e.g., MAX_X electrodes) and one or more horizontal electrodes (e.g., MAX_Y electrodes) where the TX signal from the stylus is the strongest. The host device may identify one or more subsets of electrodes based on the MAX_X electrodes or the MAX_Y electrodes determined from the full scan. At block 1050, the host machine performs a reduced or fast scan of the subsets of electrodes (identified at block 1045) to detect the stylus (as illustrated in FIG. 7). At block 1055, the host machine determines whether a stylus is detected. If the stylus is not detected, the host machine proceeds to block 1015. If the stylus is detected, the host machine determines the position of the stylus at block 1060. At block 1065, the host device may identify one or more vertical electrodes (e.g., MAX_X electrodes) and one or more horizontal electrodes (e.g., MAX_Y electrodes) where the TX signal from the stylus is the strongest. The host device may identify a second subset of electrodes around the MAX_X and MAX_Y electrodes for the next fast scan, based on the fast scan performed at block 1050. In one embodiment, the host device may identify subsets of electrodes for the next fast scan by predicting or estimating the motion of the stylus based on locations or positions determined from previous scans (e.g., from previous fast or full scans). For example, the host device may determine that a stylus is moving upwards and may identify electrodes that are above the MAX_Y electrodes.

The method 1000 shown in FIG. 10 illustrates one possible embodiment for detecting a stylus where detecting the stylus has priority over detecting touch objects (e.g., a finger). Therefore, a touch object may not be detected while the method performs blocks 1050-1065 (e.g., during fast or reduced scanning). In other embodiments, different prioritizations for touch object detection and stylus detection may be used. For example, the method 1000 may interlace a fast scan cycle with a touch object scan cycle (e.g., may alternate between fast scans for a stylus and touch object scans for a touch object). This may allow the system to simultaneously detect a stylus and a touch object (e.g., a finger). In another example, the method 1000 may prioritize touch object detection (e.g., may not switch to scanning for the stylus until a touch object is no longer detected).

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "receiving," "extracting," "scanning," "determining," "terminating," "switching," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

Although the operations of the methods herein are shown and described in a particular order, the order of the operations of each method may be altered so that certain operations are omitted, so that certain operations are added, so that certain operations may be performed in an inverse order, or so that certain operations may be performed, at least in part, concurrently with other operations. In another embodiment, instructions or sub-operations of distinct operations may be in an intermittent and/or alternating manner.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising:
   a capacitive sense array comprising a plurality of rows and columns of electrodes, wherein the capacitive sense array is configured to detect a presence of a passive touch object and a stylus; and
   a processing device coupled to the capacitive sense array, the processing device configured to:
   perform an initial scan of the plurality of rows and columns of electrodes to determine an initial position of the stylus;
   in response to determining the initial position of the stylus:
   select subsets of the plurality of rows and columns of electrodes having increased capacitance signal strength around the initial position of the stylus;
   perform one or more additional scans of the selected subsets to determine additional positions of the stylus; and
   after performing the initial scan and the one or more additional scans:
   determine a trajectory of the stylus based on the initial position and the one or more additional positions of the stylus; and
   select respective subsets of the plurality of electrodes for subsequent scans based on the determined trajectory of the stylus in combination with capacitance signal strengths received during the initial scan and the one or more additional scans.

2. The apparatus of claim 1, wherein the capacitance signal strength corresponds to a transmit (TX) signal from the stylus.

3. The apparatus of claim 2, wherein the processing device comprises one or more of a synchronous demodulator, an integrator, and a quadrature demodulator.

4. The apparatus of claim 2, wherein the processing device is further configured to
extract stylus data that is modulated into the transmit signal by the stylus, wherein the transmit signal is detected during the initial scan or the one or more additional scans.

5. The apparatus of claim 1, wherein the processing device is further configured to recognize a pattern of the stylus based on the determined trajectory of the stylus in combination with the capacitance signal strengths received during the initial scan and the one or more additional scans.

6. The apparatus of claim 1, wherein the processing device is configured to perform subsequent scans by
continually scanning additional subsets to determine future additional positions of the stylus.

7. The apparatus of claim 1, wherein the processing device is further configured to
determine that the stylus is no longer proximate to the capacitive sense array; and
terminate continual scanning of the selected subsets.

8. The apparatus of claim 7, wherein the processing device is further configured to
detect the presence of the passive touch object based one on or more of first touch scan or one or more additional scans during the touch mode, wherein the touch mode and the initial and the one or more additional scans of the stylus are not performed concurrently.

9. The apparatus of claim 1, wherein the one or more additional scans are performed at a higher rate than the initial scan.

10. The apparatus of claim 1, wherein a number of electrodes in the selected subsets is based on at least one of the trajectory of the stylus, a tip size of the stylus, or a spacing size between the plurality of rows and columns of electrodes.

11. A method comprising:
performing an initial scan of a plurality of rows and columns of electrodes in a capacitive sense array to determine an initial position of a stylus, wherein the capacitive sense array is configured to detect a presence of a passive touch object and the stylus;
in response to determining the initial position of the stylus:
selecting subsets of the plurality of rows and columns of electrodes having increased capacitance signal strength around the initial position of the stylus;
performing one or more additional scans of subsets of the plurality of electrodes to determine additional positions of the stylus; and
after performing the initial scan and the one or more additional scans:
determining a trajectory of the stylus based on the initial position and the one or more additional positions of the stylus; and
selecting respective subsets of the plurality of electrodes for subsequent scans based on the determined trajectory of the stylus in combination with capacitance signal strengths received during the initial scan and the one or more additional scans.

12. The method of claim 11, wherein the capacitance signal strength corresponds to a transmit (TX) signal from the stylus.

13. The method of claim 12, wherein the transmit signal from the stylus is received via capacitive coupling.

14. The method of claim 12, further comprising
extracting stylus data that is modulated into the transmit signal by the stylus, wherein the transmit signal is detected during the initial scan or the one or more additional scans.

15. The method of claim 14, wherein the extracted stylus data comprises one or more of battery data, acceleration data, button data, or force data.

16. The method of claim 11, wherein performing one or more additional scans comprises
continually scanning additional subsets to determine future additional positions of the stylus.

17. The method of claim 11, further comprising
determining that the stylus is no longer proximate to the capacitive sense array; and
terminating continual scanning of the selected subsets.

18. The method of claim 17, further comprising
detecting the presence of the passive touch object based one on or more of first touch scan or the one or more additional scans during the touch mode, wherein the touch mode and the first scan and the one or more additional scans of the stylus are not performed concurrently.

19. The apparatus of claim 1, wherein the processing device is further configured to switch the capacitive sense array to a touch mode to detect the presence of the passive touch object after completion of the initial scan, the one or more additional scans, or the subsequent scans when a presence of the stylus is not detected.

20. The method of claim 11, further comprising switching the capacitive sense array to a touch mode to detect the presence of the passive touch object after completion of the initial scan, the one or more additional scans, or the subsequent scans when a presence of the stylus is not detected.

* * * * *